Oct. 2, 1951          C. J. STALEGO          2,569,700
METHOD OF MAKING COLORED GLASS FIBERS
Filed June 14, 1947          2 Sheets-Sheet 1
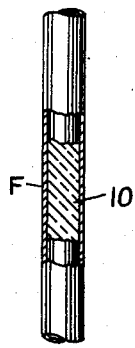
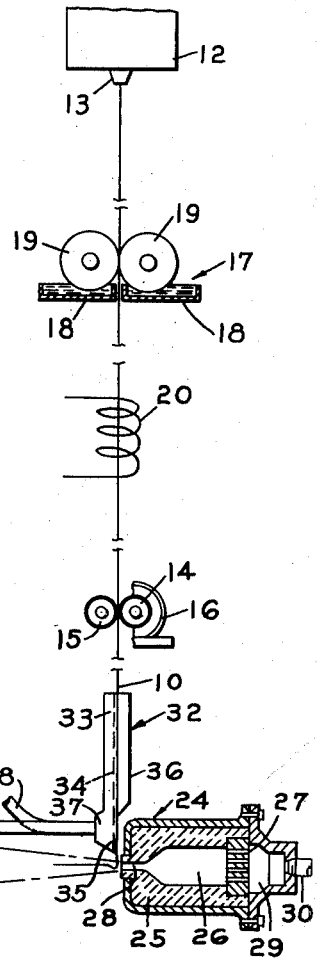
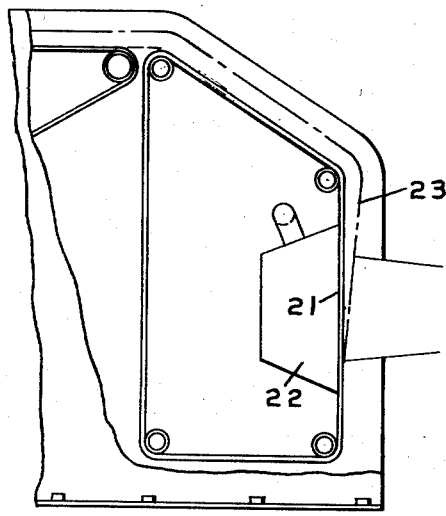
INVENTOR.
CHARLES J. STALEGO
BY
Staelin & Overman
ATTORNEYS Oct. 2, 1951          C. J. STALEGO          2,569,700
METHOD OF MAKING COLORED GLASS FIBERS
Filed June 14, 1947          2 Sheets-Sheet 2
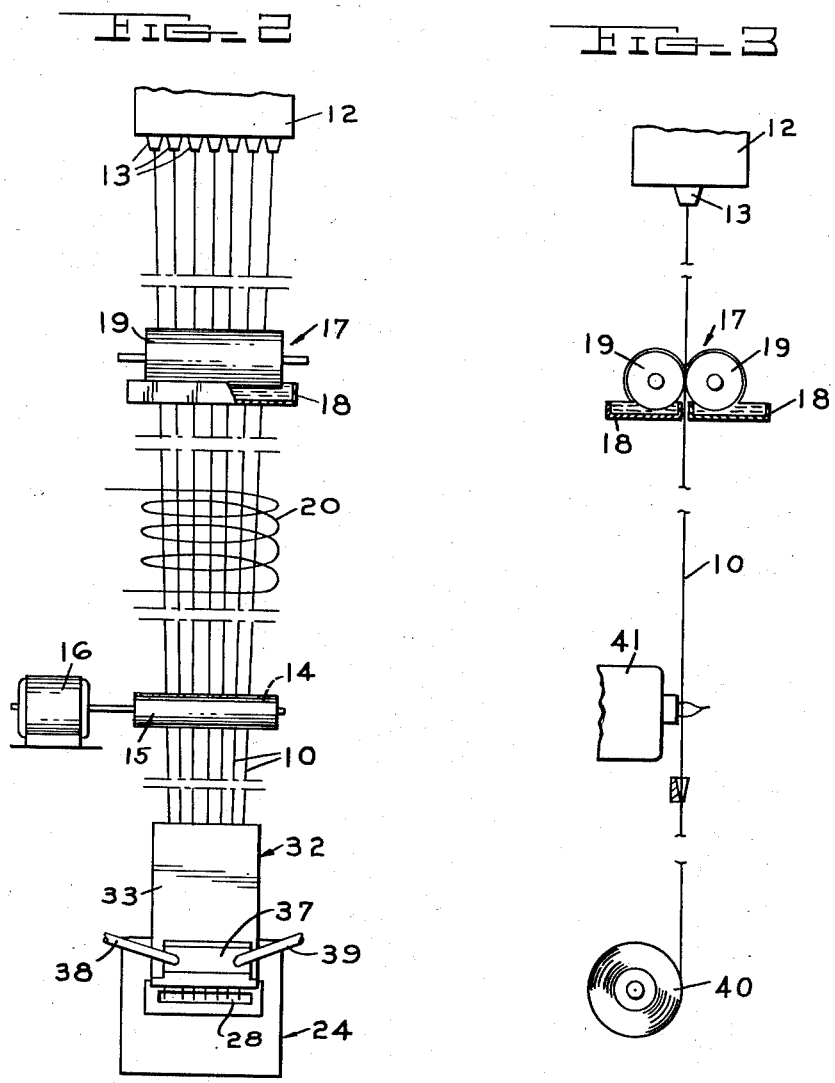
INVENTOR.
CHARLES J. STALEGO
BY
Staelin Overman
ATTORNEYS Patented Oct. 2, 1951

2,569,700

UNITED STATES PATENT OFFICE 2,569,700

METHOD OF MAKING COLORED GLASS FIBERS

Charles J. Stalego, Newark, Ohio, assignor to Owens-Corning Fiberglas Corporation, a corporation of Delaware Application June 14, 1947, Serial No. 754,644

8 Claims. (Cl. 49—77)

This invention relates to glass fibers and more particularly to an improved method of manufacturing the same.

The present invention concerns itself with the manufacture of colored glass fibers which for some applications may have a diameter less than one micron and for other uses may have a diameter of two and one-half or more microns. With this very small diameter of the fibers, the surface to glass volume ratio is so great that difficulty is encountered in coloring the fibers so that the color is clearly visible in the product produced from the fibers. It is especially difficult to color glass fibers with dyes and pigments because of the non-absorbing characteristic of glass.

With the foregoing in view, it is an object of this invention to color fine glass fibers in such a way that the colors are resistant to fading and crocking and are permanent in other respects. This is achieved by providing a colored film on the surface of glass fibers in which the color is of sufficient intensity to enable the color to be readily observed in the finished product regardless of the diameter of the fibers employed.

A more detailed object of this invention is to apply a coloring substance to the fiber surfaces that fuses to the surfaces and cannot be displaced. In general a metal oxide or a material containing a metal oxide is applied to the surface of an elongated glass body or rod so that the coloring substance remains as a film on the surface of the body during attenuation of the latter into fibers.

One satisfactory attenuating process comprises flowing streams of molten glass and cooling the streams by the atmosphere or some other means. The streams while soft and plastic or molten are attenuated or drawn out into fine fibers by a rotatable drum around which the fibers are wound. This may be referred to as the continuous filament process. In accordance with this invention the selected coloring substance may be applied to the fibers in advance of the drum to produce a colored film on the surfaces of the fibers, and this film is fused on the fibers by the application of heat, which may be the same heat that reduces the glass streams to or holds them in molten condition.

Another process comprises feeding an elongated body or rod of glass into an intensely hot high velocity blast created by burning a combustible gaseous mixture in a chamber and discharging the products of combustion through a restricted opening in one wall of the burner. The temperature of the blast is sufficiently high to progressively soften or melt the advancing end of the glass body and the velocity of the blast is sufficient to attenuate the softened or molten glass into fine fibers. This may be referred to as a staple process. In this process the selected coloring substance may be applied to the glass rod or body prior to introducing the latter into the blast, and the heat of the blast serves to fuse the colored film on the fibers.

In order to prevent the colored film from flowing off the glass body at the attenuating temperature of the blast, a coloring substance is selected having approximately the same melting temperature as the glass body or rod. In accordance with this invention the coloring substance may comprise a mixture of a metal oxide and particles of glass having substantially the same composition as the glass from which the elongated glass body or rod is formed. Thus the colored film and glass body or rod are attenuated as a unit by the blast and the resulting fibers are provided with the desired colored film.

In the accompanying drawings:

Figure 1 is a diagrammatic view illustrating one type of apparatus that may be employed to produce colored fibers in accordance with this invention;

Figure 2 is a front elevational view of the apparatus shown in Figure 1;

Figure 3 is a diagrammatic view of a modified form of colored fiber producing apparatus; and Figure 4 is a considerably enlarged sectional view of a glass fiber colored in accordance with this invention.

The equipment shown in Figures 1 and 2 of the drawings is adapted to produce very fine colored glass fibers by a so-called staple process from elongated bodies of glass such, for example, as glass filaments or rods 10. A plurality of the rods are fed in side by side relationship into an intensely hot, high velocity blast 11 and are attenuated into fine fibers by the heat and force of this blast. A film F of the selected coloring substance is applied to the rods 10 as the latter are advanced toward the blast, and this film may be fused to the surface of the rods prior to introducing the rods to the blast 11.

In the present instance the coloring substance comprises an aqueous slurry containing finely divided particles of a suitable metal oxide or a combination of different metal oxides and an adhesive or bonding agent. The particular metal oxide or combinations of metal oxides employed depends largely on the color specified. A few examples of metal oxides are cobalt oxide, manganese oxide, chromium oxide, selenium oxide, copper oxide, and other compounds of these metals and other metallic compounds suitable for coloring glass, or colored glass compositions, such as the colored glass compositions of the Schoenlaub Patent No. 2,394,493. Also any one of a number of different types of adhesives may be used as a bonding agent for the coloring material. For example, satisfactory results may be obtained by employing gums of various different types such as gum arabic or gum tragacanth, animal glue or gelatin, synthetic resins (either the thermoplastic or thermosetting types) or sodium silicate. The proportion of adhesive to coloring oxide is not especially critical. In general it is preferred to employ just sufficient adhesive or bonding agent to insure bonding the coloring composition to the glass surface. For most practical applications it has been discovered that a coloring composition containing as low as 2% and as high as 10% bonding agent is satisfactory.

In cases where the colored film F is subjected to the relatively high attenuating temperatures of a blast of products of combustion as in Figure 1 of the drawings, it is preferred to include ground or finely divided particles of glass in the coloring composition. The percentage of powdered glass used is not especially critical and may be 50% or less to 90% of the composition.

The coloring composition is prepared simply by mixing the glass particles and the selected coloring oxide or oxides in the desired proportions. The amount of coloring material or metal oxide in the composition varies widely depending largely upon the coloring oxide or combination of oxides used and also upon the intensity of the color required. For example, when cobalt oxide is selected as a coloring material, satisfactory results may be obtained by incorporating as little as 10% to 20% of the coloring material in the composition, and in cases where iron oxide is employed, it may be necessary to increase the percentage of coloring material in the composition to 80% or more. Thus, the quantity of the coloring material in the composition may vary between 10% to 90% of the composition.

After the coloring material is embodied in the composition in the selected proportions, the mixture is heated to a temperature above the melting temperature of the glass to provide a homogeneous compound which is subsequently cooled to room temperature and ground or otherwise processed to provide a fine powder. The particle size should be as fine as practical and preferably does not exceed 300 mesh. A bonding agent or adhesive consisting of any one of the above listed materials, but preferably comprising any one or a combination of group I metal silicates, such for example, as sodium silicate, or lithium silicate is included in the mixture in just sufficient proportions to insure a proper bonding of the coloring material to the glass rod or filament 10. As stated above 10% or less of adhesive is usually sufficient.

A vehicle, such for example, as water is incorporated in the mixture to provide the coloring composition with the required consistency. This consistency may, of course, be varied depending upon whether the coloring composition is applied by spraying, rolling, dipping or the squeegee processes. Regardless of the particular process of application selected, care is taken to uniformly distribute the composition over the surfaces of the glass rods to assure providing the latter with a thin film of the composition before being introduced to the blast 11.

Particularly satisfactory results are obtained in cases where the coloring composition is fused to the surfaces of the rods before the latter are fed into the blast. In instances where the blast 11 is produced by a burner and the glass rods 10 are fed into the blast along a path extending in close proximity to the burner, the heat radiating from the latter may be used to fuse the colored film on the glass rods. If desired, however, a separate heating means may be employed for the above purpose, as will be more fully hereinafter described.

Excellent results are also obtained by employing in the coloring material a glass composition which approximates the composition used in producing the glass rods or filaments 10. Actually in practicing the invention, it is preferred to provide the glass composition in the coloring material with a melting temperature sufficiently lower than the melting temperature of the glass rod or filament to enable the glass composition in the coloring substance to melt and take the coloring oxide or oxides into solution before the glass rod or filament melts in the blast. It has been discovered that the provision of a glass composition in the coloring substance or material having a melting temperature 50° to 300° lower than the melting temperature of the glass rods or filaments is suitable. However, in cases where the coloring substance embodies a group I silicate oxide, the melting temperature of the glass composition is somewhat increased by the oxide and approximates the melting temperature of the glass rods or filaments.

In instances where an adhesive other than the group I silicates are used, the composition of the glass used in the coloring material is selected to have approximately the same melting temperature as the rods or filaments. In either case the film of coloring material on the rods or filaments possesses practically the same viscosity as the glass rods or filaments when melted by the blast and is attenuated along with the rods by the heat and force of the blast. In other words the film of coloring substance is retained on the glass rods or filaments at the attenuating temperatures existing in the blast 11 and is drawn out with the glass during the fiber forming phase.

Referring now more in detail to Figures 1 and 2 of the drawings, it will be noted that the glass rods or filaments 10 are produced by a glass feeder or bushing 12 which may be in the form of a long, relatively narrow trough, having a plurality of feeding orifices in its bottom wall. Glass cullet or glass batch is fed to the bushing in any suitable manner and is heated while in the bushing to a molten condition. The molten glass flows from the orifices 13 in small streams which are attenuated to form primary filaments or rods 10 by means of coacting feed rolls 14 and 15 that grip the filaments or rods between them and which are located a distance from the bushing 12 sufficient to assure cooling of the filaments or fibers to solidification before engagement by the rolls. The feed roll 14 may be driven by an electric motor 16 indicated diagrammatically in Figure 2 of the drawings.

Suitably supported between the bushing 12 and blast 11 is a device 17 for applying the selected coloring substance to the glass rods 10. This device comprises a pair of tanks 18 and a pair of applicator rolls 19. The tanks are positioned at opposite sides of the path of travel of the glass rods or filaments 10 and the rolls 19 are respectively rotatably supported in the tanks with the peripheral portions thereof engaging opposite sides of the glass rods or filaments 10. The lower portions of the rolls are also immersed in the coloring substance contained in the tanks in a manner such that the coloring substance is transferred by the rolls from the tanks to the glass rods or filaments. The peripheral portions of the rolls have a rolling contact with each other and are sufficiently resilient to enable the glass rods 10 to pass therebetween.

The coloring substance collected on the peripheral portions of the rolls in response to rotation of the latter is uniformly applied to the glass rods and provides a thin colored film on the surfaces of the rods. The transfer rolls 19 are rotated by any suitable means (not shown) in the direction of feed of the glass rods 10 and having a peripheral speed approximating the rate of feed of the rods by the rolls 13 and 14.

As stated above the film of coloring material may be fused onto the surfaces of the glass rods 10 prior to introducing the latter to the blast 11, but this is not indispensable, and the coated rods may be fed into the blast without first fusing the coloring material.

Fusing of the film to the rod is accomplished by heating the coated glass rods 10 to a temperature sufficient to just soften the glass and permit the film to adhere to the surfaces of the glass rods. In Figures 1 and 2 of the drawings an electric heating element 20 in the form of a resistance coil is shown as positioned to surround the glass rods as the latter pass between the transfer rolls 19 and feed rolls 13 and 14. However, other types of heaters may be employed, such for example, as a series of burners positioned to direct flames against the glass rods over a substantial length of the path of the rods between the transfer and feed rolls. Less heat may be applied to the coated rods if it is desired only to dry the coating on the rods.

The film coated glass rods 10 leaving the cooperating feed rolls are fed or projected into the gaseous attenuating blast briefly discussed above. The temperature of the attenuating blast exceeds the melting temperature of the glass rods 10, and the velocity of the blast is sufficient to attenuate the molten glass into fine fibers. In some instances the temperature of the blast may approximate 2500° to 3000° F., and the velocity of the blast may be as high or higher than 1500 feet per second. In any event the blast provides sufficient heat to raise the primary glass fibers to attenuating temperature, and also provides a very high rate of attenuation of the heated glass to form fine secondary fibers having a colored film thereon.

As the secondary fibers are formed, they are carried through the atmosphere by the blast and are deposited on a suitable foraminous conveyor 21 that is moved across the path of the blast-borne fibers. A suction chamber 22 is preferably disposed at the rear side of the conveyor 21 and is arranged to extend over the deposition zone of the fibers and thereby build up a unitary mat 23.

As previously stated the high velocity of the blast is obtained by burning a combustible gaseous mixture in an enclosed chamber and exhausting the products of combustion through a restricted orifice which guides and accelerates the gases to form an intensely hot, high velocity blast. The type of combustible gas used may be of any suitable kind, but for reasons of economy, it is preferably an ordinary fuel gas, such as natural or manufactured fuel gas. This gas is mixed with the proper amount of air by means of the orthodox air and gas mixers. The gas and air mixture is taken from the mixer at moderate pressure of approximately one to five pounds per square inch, but may be considerably higher if desired, and is led through an ordinary conduit to an enclosed ignition chamber where ignition of the gaseous mixture takes place.

In Figures 1 and 2 of the drawings one type of apparatus is illustrated for burning the gaseous mixture to create the required attenuating blast. This apparatus comprises a burner 24 having a body 25 of refractory material and having a combustion chamber 26 therein. One end of the combustion chamber terminates at the perforated wall 27 having a plurality of small orifices extending therethrough and the other end of the chamber is provided with a wall having a restricted outlet or discharge passage 28 therein. The refractory body may be surrounded by a sheet metal shell which extends past one end of the body to form an inlet chamber 29 between the end of the shell and the perforated wall 27. A suitable conduit 30 connects with the shell to feed the combustible gaseous mixture into the inlet chamber 29. The gaseous mixture enters the inlet chamber 29 and passes through the orifices in the wall 27 where it ignites and burns with a resulting high degree of expansion.

During operation the walls of the chamber 26 are heated by the burning gas and the hot walls tend to increase the rate at which the gas entering the chamber burns. The resulting high rate of combustion causes a great expansion of the products of combustion which, as they pass through the outlet passage 28, are accelerated into a very high velocity blast of intense heat. The aim is to feed as much gaseous mixture into the chamber 26 as possible without causing the combustion to become unstable or to take place at the outside of the chamber, or to cease altogether.

The outlet passage 28 is elongated and is substantially less in cross sectional area than the chamber 26, so that the products of the combustion taking place within the chamber are accelerated as they pass through the opening or passage 28 to provide a blast of the gases moving at a very high velocity. In this connection it may be pointed out that the cross sectional area of the passage 28 may be varied to some extent relative to the cross sectional area of the chamber 26, depending upon the heat required in the blast leaving the outlet passage. Passages of greater cross sectional area relative to the cross sectional area of the chamber 26 permit burning a greater amount of gas and result in greater heat of the blast, but also cause a decrease in the velocity of the blast. Preferably, however, the cross sectional area of the outlet passage 28 is no greater than necessary to obtain in the blast the heat required to raise the glass to the attenuating temperature.

In the present instance the film coated glass rods 10 are directed into the blast 11 immediately adjacent the front wall of the burner by a guide 32 supported below the coacting feed rolls 13 and 14. The guide 32 comprises a plate 33 elongated in the direction of the path of travel of the glass rods 10 leaving the feed rolls and having a plurality of laterally spaced grooves 34 corresponding in number to the number of glass rods.

The lateral spacing of the grooves 34 is such that these grooves respectively receive the glass rods leaving the feed rolls and the grooves extend for the full length of the plate 33. The lower end portion 35 of the plate 33 extends downwardly in juxtaposition to the front wall of the burner and terminates substantially flush with the top wall of the passage 28. It is pointed out in this connection that the length of the passage 28 corresponds to the width of the plate 33 so that all of the glass rods leaving the delivery end of the plate or guide are projected into the gaseous blast issuing from the passage 28.

The guide 32 is provided with a cover 36, which is secured to the rear face of the plate 33 over the grooves 34 to enclose the primary fibers. The lower end of the cover 36 terminates short of the portion 35 of the plate 33 to expose the glass rods directly to the heat radiating from the front wall of the burner 24. Due to the fact that the portion 35 of the guide or plate 33 extends in such close proximity to the burner 24, this plate is subjected to extremely high temperatures and, if desired, may be cooled by providing a jacket 37 at the front side of the plate 33. A cooling medium from a suitable source may be conveyed to the jacket 37 through an inlet conduit 38 and discharged from the jacket through an outlet conduit 39.

As the glass rods 10 are advanced into the blast 11, they pass in heat conducting relation to the front wall of the burner 24 and the heat radiated from this wall, together with the heat radiating from the blast, is sufficient to soften the glass to the extent required to fuse the colored film on the surfaces of the glass rods 10. Thus if desired the auxiliary or separate heating means previously described and designated in the drawing by the numeral 20 may be eliminated.

As the film coated rods 10 are projected into the blast 11, the advancing ends are melted or softened sufficiently to enable the kinetic energy of the blast to draw the glass out in the form of fine fibers. Inasmuch as the colored film on the rods has substantially the same melting point as the glass rods, it is drawn out with the rods by the heat and force of the blast. The film is retained on the finished fibers and the latter are colored to the specified shade. The particular shade depends upon the metal oxide selected and a few examples of metal oxides capable of being used are cobalt oxide, iron oxide, nickel oxide, manganese oxide and chromium oxide.

It will also be noted from Figure 3 of the drawings that it is possible to employ the above coloring technique in connection with the so-called continuous process. In this process the molten glass streams flowing from the orifices 13 in the bottom wall of the bushing 12 are attenuated into fine glass fibers by a rotatable drum 40 around which the fibers are wound in substantially continuous lengths. A coloring substance preferably of the same composition previously described is applied to the fibers by a device identical to the device 17 employed in connection with the staple process. This device is positioned to apply the coloring composition to the surfaces of the fibers as they are attenuated by the drum and serves to distribute the coloring substance in a manner to provide a thin film of the coloring substance on the fibers before the latter are wrapped around the drum.

In the above continuous process, the colored film is also fused to the fibers by the application of heat to the fibers at a point between the applying device 17 and the winding drum 40. In the present instance the heat is supplied by a burner 41 positioned to direct a flame on the film coated fibers just before the latter are wrapped around the drum 40. However, other types of heat producing means may be employed, such for example, as electrical or induction types of heaters. In any case the heat supplied is sufficient to soften the fibers and fuse the film on the surface of the fibers. Thus the film is, in effect, integral with the fibers and although the latter may be of microscopic size, the film imparts a definite color to the fibers which is readily visible, especially in the product formed by the fibers.

I claim:

1. The process of making colored glass fibers which comprises producing a stream of molten glass, drawing out the stream into a fine solidified fiber, applying a coloring substance from a fluid dispersion thereof on the surface of the cold fiber, fusing the coloring substance on the fiber surface by the application of heat to provide an integral colored film on the surface of the fiber, and drawing out the colored fiber by the application of attenuating heat and forces thereto.

2. The process of making colored glass fibers which comprises producing an intensely hot high velocity blast of the products of combustion of a burning gaseous mixture, feeding an elongated body of solidified glass into the blast, attenuating the body of glass into fine fibers by the heat and force of the blast, applying to the surface of the glass a film of vitreous coloring substance, and fusing said vitreous coloring substance to the elongated body of glass prior to introducing the latter to said blast.

3. The process of making colored glass fibers which comprises producing an intensely hot high velocity blast of the products of combustion of a burning gaseous mixture, feeding a solidified rod of glass into the blast, attenuating the rod of glass into fine fibers by the heat and force of the blast, applying a film of fusible coloring material from a fluid dispersion thereof to the surface of the rod prior to introducing the latter to the blast.

4. The process of making colored glass fibers which comprises burning a combustible gaseous mixture in a chamber having a restricted outlet opening through which the products of combustion are discharged in the form of an intensely hot high velocity blast, feeding a rod of glass endwise into the blast from one side of the latter, attenuating the glass at the advancing end of the rod into fine fibers by the heat and force of the blast, applying a film containing a vitreous coloring substance to the surfaces of the rod prior to introducing the latter to the blast, and fusing the film to the rod by the application of heat to the rod and film.

5. The process of making colored glass fibers which comprises feeding an elongated body of solidified glass along a predetermined path of travel, applying to the glass body a vitreous coloring substance having a melting point approximating the melting temperature of the glass body, fusing the coloring substance as a film to the glass body, continuously heating the advancing end of the film coated body to an attenuating temperature, and attenuating the heated portion to form a relatively fine colored fiber.

6. The process of making colored glass fibers which comprises feeding a glass rod along a predetermined path of travel, applying to the surface of the glass rod a colored film having a melting temperature approximating the temperature at which the glass melts and including a mixture of metal oxide and particles of glass, continuously melting the advancing end of the film coated rod, and attenuating the molten glass to form relatively fine fibers.

7. The process of making colored glass fibers which comprises feeding a glass rod along a predetermined path of travel, applying to the surface of the glass rod a colored film including a mixture of metal oxide, fine glass particles of substantially the same composition as the glass rod and a diluent, fusing the film on the surface of the rod by the application of heat to the rod and film, continuously melting the advancing end of the film coated rod, and attenuating the molten glass to form fine colored fibers.

8. The process of making colored glass fibers which comprises feeding a rod of glass along a predetermined path of travel, applying to the surface of the glass rod a colored film having a melting temperature approximating the melting temperature of the glass, fusing said film to the surface of the rod, heating the advancing end of the film coated rod to a temperature at which the glass and film will flow under the influence of forces urging the rod to elongate, and attenuating the glass rod and film by the application of such forces.

CHARLES J. STALEGO.

REFERENCES CITED

The following references are of record in the file of this patent:

UNITED STATES PATENTS

| Number | Name | Date |
|---|---|---|
| 1,798,997 | Batcheller | Mar. 31, 1931 |
| 1,949,884 | Slayter | July 14, 1932 |
| 1,986,349 | Lardy | Jan. 1, 1935 |
| 2,215,150 | Hannen | Sept. 17, 1940 |
| 2,234,986 | Slayter et al. | Mar. 18, 1941 |
| 2,245,783 | Hyde | June 17, 1941 |
| 2,300,736 | Slayter et al. | Nov. 3, 1942 |
| 2,405,036 | Hoffman | July 30, 1946 |
| 2,407,456 | Simison et al. | Sept. 10, 1946 |
| 2,433,116 | Greenbowe et al. | Dec. 23, 1947 |
| 2,450,363 | Slayter et al. | Sept. 28, 1948 |
| 2,457,777 | Holtschulte et al. | Dec. 28, 1948 |

FOREIGN PATENTS

| Number | Country | Date |
|---|---|---|
| 381,582 | Great Britain | Sept. 29, 1932 |
| 840,209 | France | Jan. 11, 1939 |